US007934321B2

(12) United States Patent
Johnson et al.

(10) Patent No.: US 7,934,321 B2
(45) Date of Patent: May 3, 2011

(54) TILT SWITCH EMPLOYING GRAPHITE

(75) Inventors: Michael David Johnson, Friendswood, TX (US); Robert Louis Clark, Jr., Johnston, IA (US)

(73) Assignee: Egresson, LLC, Friendswood, TX (US)

( * ) Notice: Subject to any disclaimer, the term of this patent is extended or adjusted under 35 U.S.C. 154(b) by 247 days.

(21) Appl. No.: 12/392,212

(22) Filed: Feb. 25, 2009

(65) Prior Publication Data

US 2009/0223787 A1 Sep. 10, 2009

Related U.S. Application Data

(63) Continuation-in-part of application No. 11/401,162, filed on Apr. 10, 2006, now Pat. No. 7,562,458.

(60) Provisional application No. 60/670,842, filed on Apr. 13, 2005, provisional application No. 61/067,000, filed on Feb. 25, 2008.

(51) Int. Cl.
*G01C 9/06* (2006.01)
*H01H 35/02* (2006.01)

(52) U.S. Cl. .................... 33/333; 33/366.11; 33/366.24; 200/61.45 R; 200/61.52

(58) Field of Classification Search .................... 33/333, 33/365, 366.11, 366.21, 366.24, 366.25, 33/366.27; 200/61.45 R, 61.46, 61.52
See application file for complete search history.

(56) References Cited

U.S. PATENT DOCUMENTS 306,050 A 10/1884 Bartlett
0,466,380 A 1/1892 Spencer
0,559,090 A 4/1896 West
0,778,444 A 12/1904 Carstarphen, Jr.
1,055,153 A 3/1913 Ferguson
1,079,380 A 11/1913 Thomas
1,241,888 A 10/1917 Stafford
1,391,782 A 9/1921 McDonnald
1,414,932 A 5/1922 Chisman
1,563,934 A 12/1925 Sperry
2,455,394 A 12/1948 Webber
2,687,453 A * 8/1954 Saxl .............................. 200/200
2,852,645 A 9/1958 Cid
2,928,668 A 3/1960 Blasingame
3,103,120 A * 9/1963 Tinney ............................ 73/492
3,111,036 A 11/1963 Kistler
3,806,109 A 4/1974 Weber et al.
3,962,693 A 6/1976 Schamblin
4,102,055 A 7/1978 Volk, Jr.
4,205,665 A 6/1980 Burton
4,306,456 A 12/1981 Maerfeld
4,769,584 A 9/1988 Irigoyen et al.
5,006,487 A 4/1991 Stokes
5,058,283 A 10/1991 Wise et al.
5,144,823 A 9/1992 Wood
5,157,842 A 10/1992 Swanda
5,205,004 A 4/1993 Hayes et al.
5,611,096 A 3/1997 Bartlett et al.
5,715,548 A 2/1998 Weismiller et al.

(Continued)

*Primary Examiner* — Amy Cohen Johnson
(74) *Attorney, Agent, or Firm* — Hulsey, P.C.; William N. Hulsey, III; Loren T. Smith

(57) ABSTRACT

The invention relates to a form of a tilt switch that solves the problem of poor electrical contact, excessive/unpredictable hysteresis, high contact resistance, short life and/or electrical bounce. The tilt switch uses conventional ball-in-tube construction and adds a graphite powder film to all electrically conductive surfaces in the switch. This non-mercury tilt switch provides additional features such as enhanced electrical contact, reduced or eliminated hysteresis, lowered contact resistance, increased contact life and eliminates electrical bounce.

20 Claims, 6 Drawing Sheets

U.S. PATENT DOCUMENTS 5,822,813 A 10/1998 Powell
5,956,855 A 9/1999 Foss et al.
6,180,873 B1 1/2001 Bitko
6,182,310 B1 2/2001 Weismiller et al.
6,182,509 B1 2/2001 Leung
6,279,183 B1 8/2001 Kummer et al.
6,353,949 B1 3/2002 Falbo
6,353,950 B1 3/2002 Bartlett et al.
6,356,203 B1 3/2002 Halleck et al.
6,397,716 B1 6/2002 Garuglieri
6,505,365 B1 1/2003 Hanson et al.
6,706,978 B2 * 3/2004 Wagatsuma et al. ... 200/61.45 R
6,849,814 B2 * 2/2005 Ogden ....................... 200/61.46
6,986,180 B1 1/2006 Wilke et al.
7,117,607 B2 10/2006 Horgan
7,319,386 B2 1/2008 Collins, Jr. et al.
7,346,944 B2 3/2008 Shaw
7,487,562 B2 2/2009 Frondorf et al.
7,562,458 B1 * 7/2009 Clark et al. ..................... 33/333
2007/0044237 A1 3/2007 Williams

* cited by examiner

TILT SWITCH EMPLOYING GRAPHITE

CROSS-REFERENCE TO RELATED APPLICATIONS

This application is a continuation-in-part of U.S. patent application Ser. No. 11/401,162 entitled "DEVICE TO REDUCE THE INCIDENCE OF ASPIRATION" filed Apr. 10, 2006, which claims the benefit of priority to U.S. provisional patent application No. 60/670,842 entitled "HOSPITAL BED INCLINATION SENSOR AND ALARM" filed Apr. 13, 2005. This application also claims the benefit of priority of U.S. provisional patent application No. 61/067,000 entitled "TILT SWITCH EMPLOYING GRAPHITE" filed Feb. 25, 2008.

FIELD

This invention relates generally to tilt switches in particular those that eliminate or minimize actuation electrical power, reduce operating hysteresis, provide positive electrical function, eliminate the need for switches containing mercury or other toxic liquid metals and reduce manufacturing costs.

DESCRIPTION OF THE RELATED ART

Various methods have been devised to provide tilt switches in prior art. These switches may be classified as electrically actuated and self actuated.

The first class, electrically actuated, utilizes some form of electrically powered sensor or inertial stabilized element to sense the angle between the local gravity vertical and the reference plane of the switch (i.e. the "tilt angle"). Examples of such devices are servo pendulum accelerometers (U.S. Pat. No. 3,111,036, Kistler, and U.S. Pat. No. 5,006,487, Stokes), vibratory accelerometers (U.S. Pat. No. 2,928,668, Blasingame and U.S. Pat. No. 4,306,456, Maerfeld), convective accelerometers (U.S. Pat. No. 2,455,394, Webber and U.S. Pat. No. 6,182,509, Leung), and gyroscopic stabilized platforms (U.S. Pat. No. 1,563,934, Sperry) to name a few. These instruments generally have very low "operating hysteresis" (i.e. the angular difference between actuation during increasing tilt angle and deactivation during decreasing tilt angle or vice versa). The cited instruments suffer since they require electrical power to maintain any angle measuring capability either before or after the desired tilt angle is achieved. This generally prevents the extended duration use of such electrical switches in portable, battery powered devices.

The second class, self actuated, utilizes some form of gravity powered sensor or gravity stabilized element to sense the tilt angle. Examples of such devices are pendulum switches (U.S. Pat. No. 778,444, Carstarphen, Jr., U.S. Pat. No. 1,055,153, Ferguson, U.S. Pat. No. 3,962,693, Schamblin), rolling ball switches (U.S. Pat. No. 306,050, Bartlett, U.S. Pat. No. 1,414,932, Chisman and U.S. Pat. No. 1,241,888, Safford), mercury switches (U.S. Pat. No. 1,079,380, Thomas and U.S. Pat. No. 1,391,782, McDannold), and electrolytic switches (U.S. Pat. No. 2,852,645) to name a few.

These instruments have an advantage over powered sensors since they require no power to maintain angle measuring capability either before or after the desired tilt angles are achieved. All of these instruments suffer from the fact that they generally have very large operating hysteresis or require heavy masses (e.g. heavy pendulum bob) or large dimensions (e.g. long pendulum) to reduce operating hysteresis. The liquid electrical switches suffer from the use of toxic metals (e.g. mercury switches) or decomposable electrolytes (e.g. electrolytic switches). Rolling ball electrical switches generally suffer from poor electrical contact, excessive/unpredictable hysteresis, high contact resistance, short life and/or electrical bounce.

Other examples of metal-to-metal electrical switches are ball contact magnetic relays where a ferromagnetic ball is attracted (or repelled) by a solenoid or magnet to make or break an electrical circuit using the ferromagnetic ball as an electrical bridge between two electrical contacts. These devices generally suffer from poor electrical contact characteristics due to the nature of the metal ball surface electrical properties. As such, a large magnetic force is required to hold the metal ball in place between the contacts ensuring a good electrical connection between the contact terminals of the switch.

Prior art methods of increasing the electrical conductive properties of the ball have been attempted. For example, U.S. Pat. No. 6,180,873, Bitko, utilizes the discovery that certain liquids have varying dielectric properties depending upon the thickness of the liquid layer. These liquids are called mesoscopically conductive liquids or mesoscopic conductors or mesoscopic liquids. Thick layers of these mesoscopic liquids are insulators; whereas thin layers are conductors. One embodiment of the Bitko device involves a use of mesoscopic conductors in a current carrying device wherein a conductor moves relative to a conducting surface, which it engages. The Bitko device has the disadvantage of requiring containment of a (sometimes toxic) liquid substance which increases production costs and adds leakage risk.

German Patents DE9007264 and DE4021055, Gillert, utilize a cylindrical housing of electrically conductive material that encloses a space having a downwardly tapered conical portion in which a ball rides in a partial filling of conductive powder or granular material, preferably graphite or metallic dust. In the rest position the ball is seated in the taper making no contact between the switch terminals. At a predetermined angle of tilt, the ball rolling is damped by the bed of powder. Thus, the switch contact is substantially free from bounce even when the apparatus is jolted due to the dampening effect of the graphite powder. The Gillert device uses a large amount of graphite powder to dampen the motion of the ball and is at a serious disadvantage since the pile of graphite can also short between the contacts thus increasing the hysteresis of the tilt switch.

SUMMARY

The present invention is directed to tilt switches and other devices exploiting conductive graphite films. Graphite films operate as an insulator and as a conductor as a function of the thickness of a layer of the graphite film.

In one embodiment, the graphite film is applied to a charge carrying device as an interface between electrodes. In long distances across a film surface, the graphite film has high resistivity, acting as an insulator and thereby preventing or substantially eliminating charge transfer between electrodes. The graphite film conductor separating the electrodes transfers charge or current when the current carrying members touch each other. In such an embodiment, the electrodes might be movable into and out of engagement or be permanently engageable. The relative movement of electrodes might involve rolling, rotating, sliding, or the like, or any combination thereof.

DRAWINGS

The objects and advantages of embodiments of the present invention are apparent from the following detailed descriptions of preferred embodiments in connection with the accompanying drawings in which like numerals designate like elements, and in which.

Figure 4A:
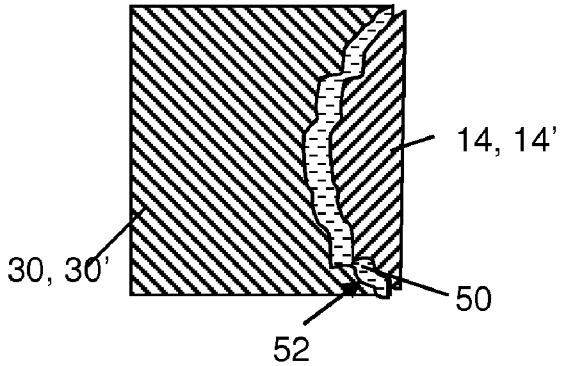
Figure 4B:
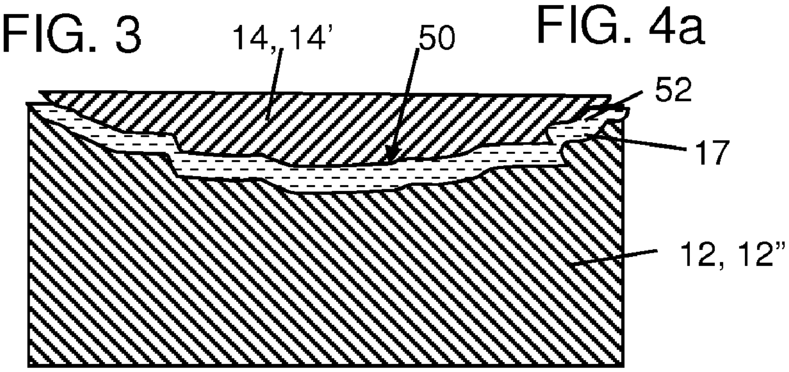
Figure 6A:
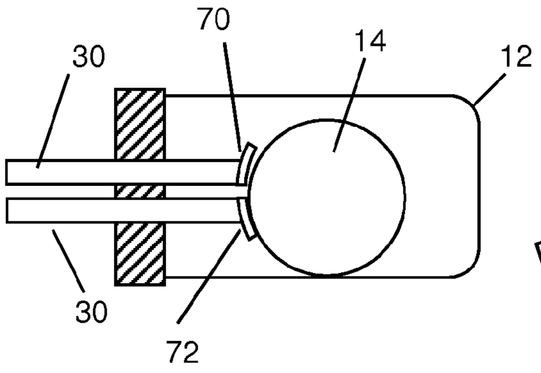
Figure 6B:
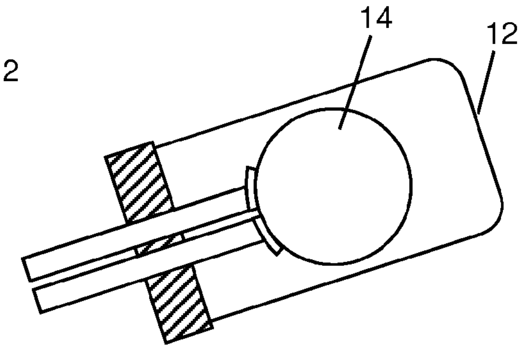
Figure 6C:
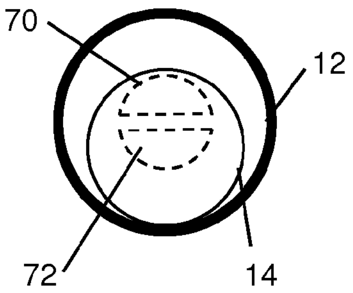
Figure 5A:
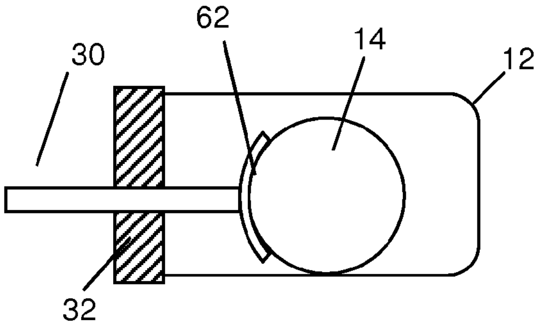
Figure 5B:
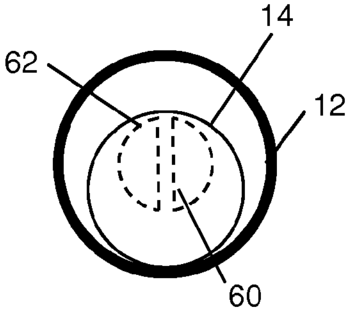
Figure 7:
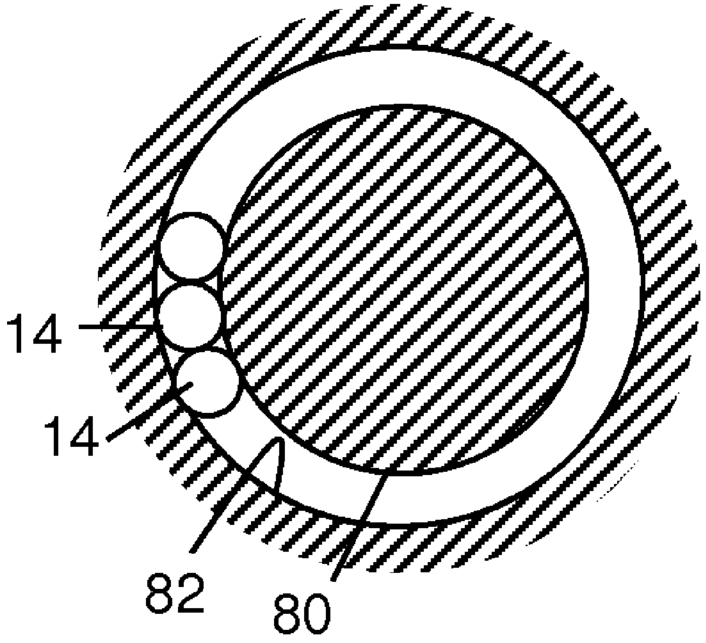
Figure 8:
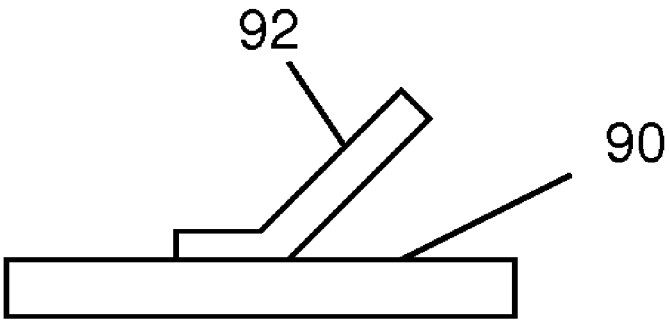
Figure 9A:
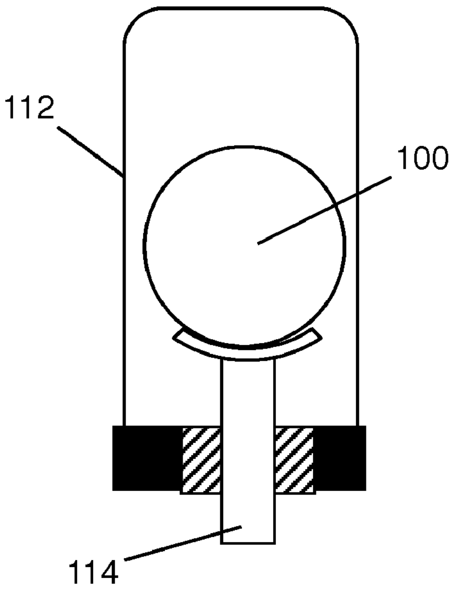
Figure 9B:
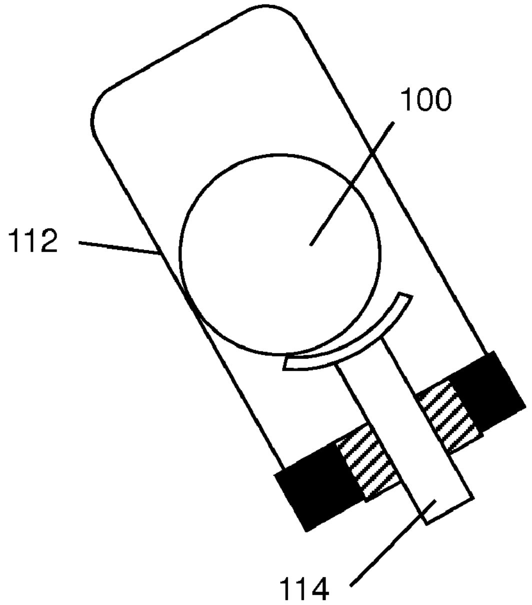
Figure 10A:
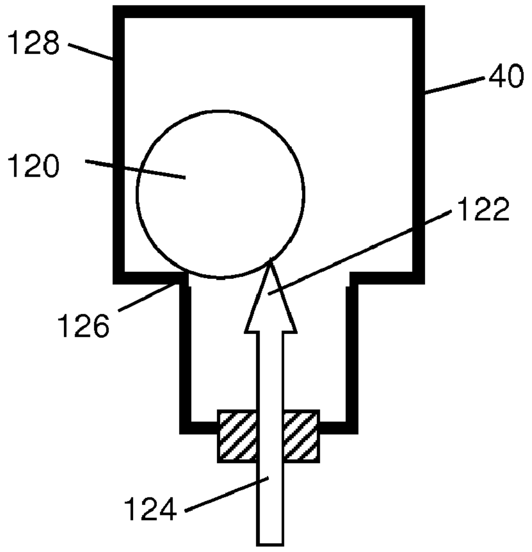
Figure 10B:
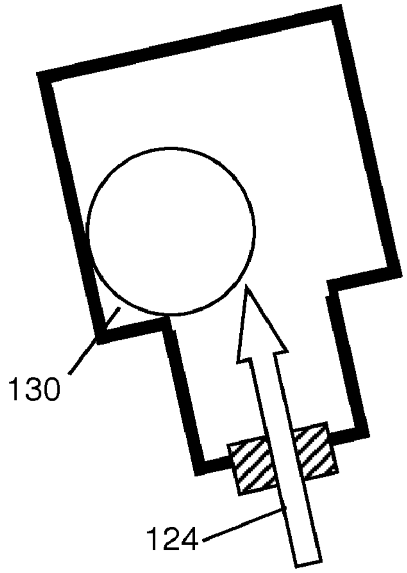
Figure 11A:
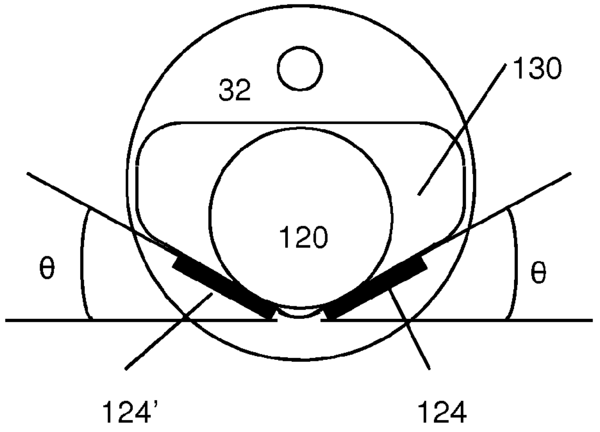
Figure 11B:
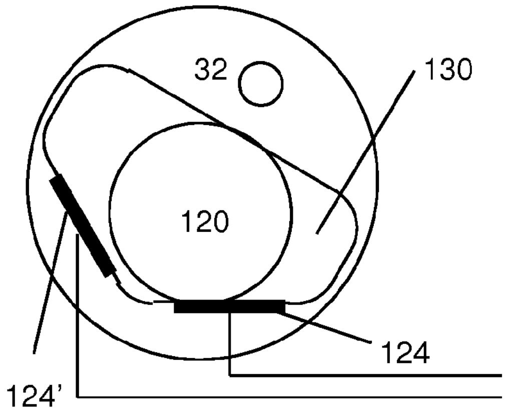

FIGS. 4*a* and 4*b* are fragmentary views depicting an interface between the roller and the case and an interface between the roller and the insulated electrode;

FIGS. 5*a* and 5*b* depict yet another embodiment of the invention;

FIGS. 6*a*-6*c* depicts another embodiment wherein the electrodes are in permanent, relatively rollable engagement;

FIG. 7 depicts an additional embodiment wherein the electrodes are in permanent, relatively rollable and/or slidable engagement;

FIG. 8 is a side view of still another embodiment of the invention where the electrodes are in permanent relatively slidable engagement;

FIG. 9*a* is a cross-sectional view of another embodiment of the present invention wherein a tilt switch is in a normally open state;

FIG. 9*b* is a view of the switch according to FIG. 9*a* after being tilted to a closed state;

FIG. 10*a* is a cross-sectional view of another embodiment of the invention wherein a tilt switch is in a normally closed state;

FIG. 10*b* is a view of the switch according to FIG. 10*a* after being titled to an open state;

FIG. 11*a* is a view of another embodiment of the present invention wherein a tilt switch is in a dual angle measuring mode, center position normally closed; and FIG. 11*b* is a view of the switch according to FIG. 11*a* after being titled to an open state.

Figure 12A:
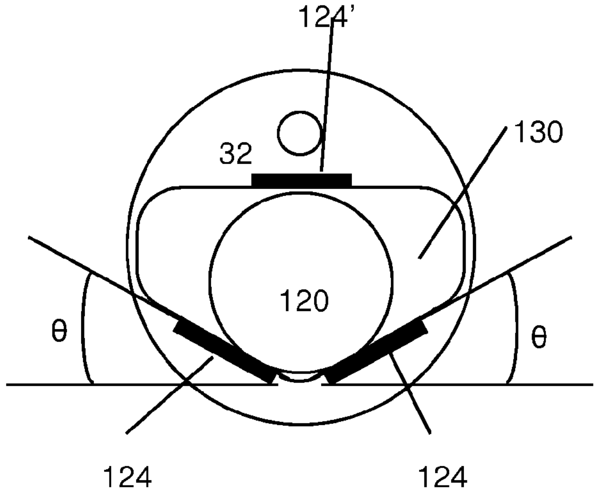
Figure 12B:
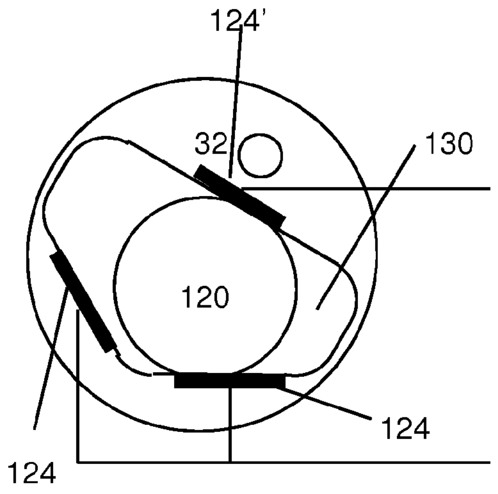

FIG. 12*a* is a view of another embodiment of the present invention wherein a tilt switch is in a dual angle measuring mode, center position normally open; and FIG. 12*b* is a view of the switch according to FIG. 12*a* after being titled to a closed state.

Figure 13A:
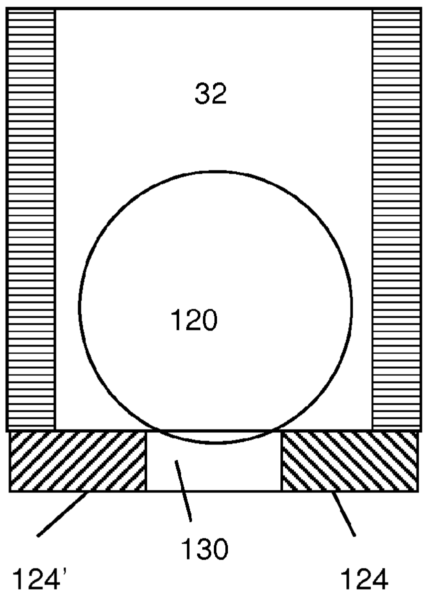
Figure 13B:
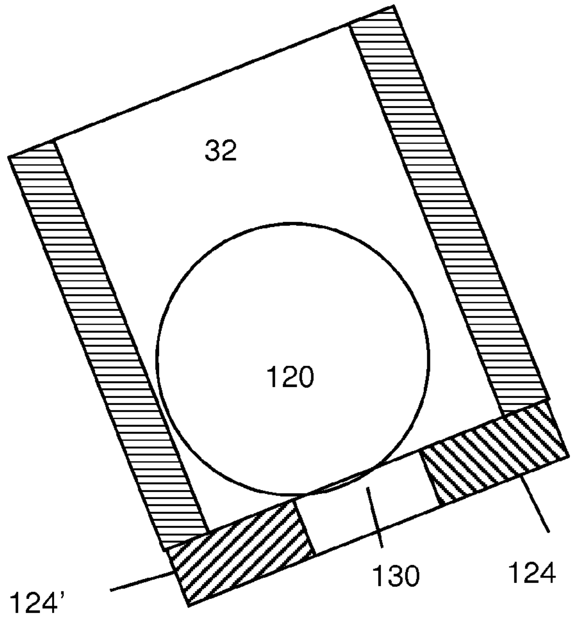

FIG. 13*a* is a view of another embodiment of the present invention as an omnidirectional tilt switch, center position normally closed; and FIG. 13*b* is a view of the switch according to FIG. 11*a* after being titled to an open state.

Figure 14A:
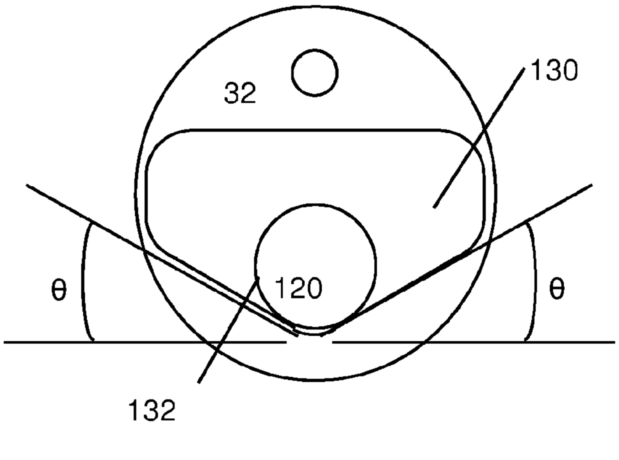
Figure 14B:
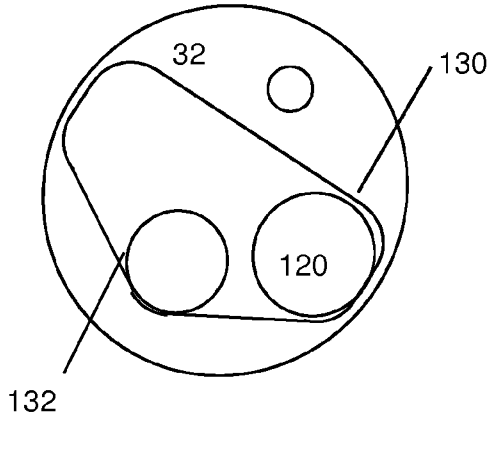

FIG. 14*a* is a view of another embodiment of the present invention including a visual tilt indicator; and FIG. 14*b* is a view of the switch according to FIG. 14*a* after being titled to an alternate state.

DRAWINGS—REFERENCE NUMERALS

| | |
|---|---|
| 10 | Tilt Switch |
| 12 | Case |
| 14 | Shorting Member |
| 16 | Inner Surface |
| 17 | Cylindrical Portion |
| 18 | Chamber |
| 20 | Circular Portion |
| 22 | Extended Flange |
| 24 | Extended Flange |

-continued

| | |
|---|---|
| 26 | Conductive Shell |
| 28 | Tab |
| 30 | Electrically Conductive Terminal |
| 32 | Insulator |
| 50 | Electrically Conductive Interface |
| 51 | Terminal Face |
| 52 | Electrically Conductive Interface |
| 60 | Semi-circular Segments |
| 62 | Semi-circular Segments |
| 70 | Semi-circular Electrode Segments |
| 72 | Semi-circular Electrode Segments |
| 80 | Rotatable Cylindrical Surfaces |
| 82 | Rotatable Cylindrical Surfaces |
| 90 | Surface |
| 92 | Moveable Member |
| 100 | Electrically Conductive Ball |
| 112 | Conductive Casing |
| 114 | Terminal |
| 120 | Electrically Conductive Ball |
| 122 | Terminal Head |
| 124 | Terminal |
| 126 | Edge |
| 128 | Casing |
| 130 | Recess |

DETAILED DESCRIPTION

The present invention involves the use of graphite film conductors in devices wherein current is conducted, and particularly wherein the current is to be modified, e.g., insulated, reduced, amplified, or otherwise regulated. For example, the invention includes the use of graphite film conductors in devices wherein a current carrying element is insulated under certain circumstances but permitted to conduct under other predetermined circumstances, e.g., a switch.

Graphite film conductors are characterized by their ability to adhere to metal surfaces. This property produces a highly conductive, non-corroding surface on the metal surface. The natural self adhering graphite layer can be used on any conductive metal surface to enhance the electrical conductivity between two metal surfaces. This is particularly useful to enhance a point contact (e.g. a bearing resting on a flat surface) or a line contact (e.g. a cylinder resting on a flat surface) electrical connection as typically found in tilt switches.

A graphite film conductor can be applied in any manner for use in the invention. For example, dusting, wiping, brush application, rolling, solvent application, spraying, etc. can all be used in the invention. This disclosure contemplates that there will always be at least a minimal continuous layer (i.e., at least one molecule thick) of graphite film conductor between electrodes. A significant characteristic of graphite film conductors is that these films possess high resistivity in the transverse (i.e. parallel to the largest area dimension) direction across thin films but low resistivity in the normal direction through the graphite thin film.

The unique and advantageous properties of graphite film conductors ensure that such conductors will prove to be useful in a wide variety of applications. For example, graphite film conductors will be useful in the fabrication of various types of switches, magnetically operated relays, thermocouples, thermostats, pressure sensors, accelerometers, adjustable capacitors (i.e., electronically adjustable), and other such devices that will readily suggest themselves to the skilled worker in this art in view of the present disclosure.

The present invention provides, among other things, a current carrying device including a pair of electrodes and a mobile or variably positioned conductive or charge carrying element (or shorting element or member) surrounded by, or separated from an electrode by, a layer of graphite film. In one embodiment, the mobile shorting element is perpetually in electrically conductive proximity (or graphite film proximity) to at least one electrode. As such, the mobile shorting element functions as a variably positioned extension of at least one electrode. Alternatively, the current carrying device comprises a pair of electrodes coated with a graphite film, the coated electrodes separated by a layer of graphite film coated on a suitable shorting element.

Known tilt switches may experience dramatic electrical hysteresis in operation. For a typical tilt switch wherein the circuit closes at 42° the circuit may only leave contact at 30°. The application of a graphite film reduces this electrical hysteresis to 1° or less, a reduction of approximately 90%.

In one embodiment the electrodes and mobile current carrying element are configured so that at least one electrode and the mobile current carrying element are substantially in perpetual graphite film proximity; under specified conditions, the mobile current carrying element moves into graphite film proximity, and thus electrically connects, the remaining electrode. The action of the mobile current carrying element is such that the electrodes are functionally isolated from each other only by the orientation of the mobile current carrying element and the graphite film. When the distance between the mobile current carrying element and the remaining electrode is great, i.e., a super-graphite film distance, there is no electrical connection; when the distance is small, i.e., a sub-graphite film distance or within graphite film proximity, an electrical connection is effected.

The present invention provides a method for regulating or controlling current flow through a current carrying device including separating electrodes by a layer of graphite film, and regulating the current flow between the electrodes by varying the current carrying distance of the graphite film conductor separating the electrodes. In such a method, the current flow is either facilitated or prevented as a function of the contact with the graphite film separating the electrodes.

Such a device will be recognized by one of ordinary skill in the art as a useful substitute for a tilt switch, particularly a mercury switch.

Figure 1:
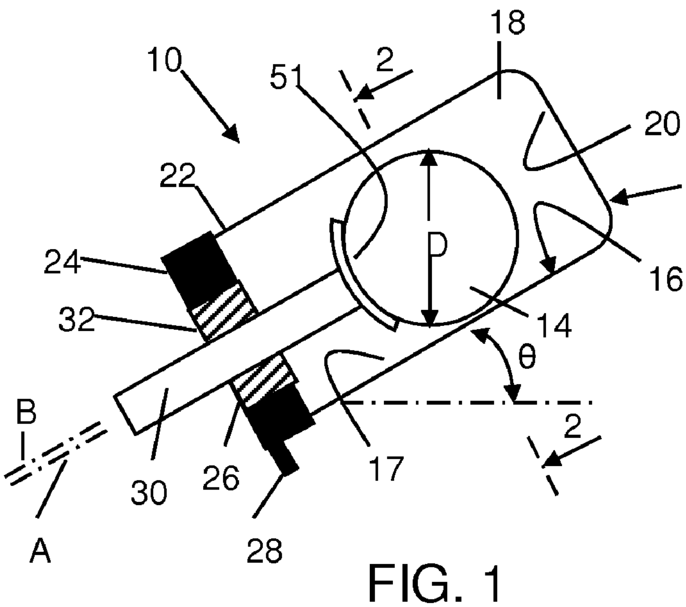
FIG. 1 is a longitudinal sectional view of a first embodiment of the invention with the longitudinal axis oriented at an angle to the horizontal, utilizing a spherical ball as a shorting element.
Figure 2:
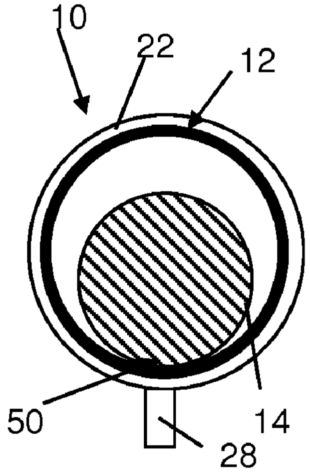
FIG. 2 is an end view of FIG. 1, showing the proximity of the ball to the case.

More particularly, an embodiment of tilt switch 10 is depicted in FIGS. 1 and 2. This embodiment comprises case 12 and ball-shaped, i.e., spherical, shorting member 14 displaceably mounted within chamber 18 formed by the casing. Inner surface 16 of the casing, which includes cylindrical portion 17 and circular portion 20, is symmetrically configured about longitudinal axis B of the chamber, and is formed of an electrically conductive material such as a metal. The diameter of the cylindrical portion is larger than the diameter D of shorting member 14.

At an end of the casing opposite circular surface portion 20, electrically conductive terminal 30 is sealed by insulator 32 within conductive shell 26, which shell has extended flange 24 welded to extended flange 22 of case 12. Conductive shell 26 has tab 28 which provides for electrical termination of the case. An end of terminal 30 projects into chamber 18 and includes terminal face 51 desirably, but not necessarily, shaped as a spherical segment of the same radius as sphere 14, i.e., one half diameter D. Other surface shapes could be used as well.

Terminal 30 extends along axis A, which axis A is offset relative to axis B so that when shorting member 14 rolls into contact with terminal 30, the axis A will pass through the geometrical center of shorting member 14 for alignment of that member in terminal face 51. The mutually contacting faces of terminal 30 and sphere 14 define electrically conductive interface 52 (see FIG. 4*a*) which is desirably, but not necessarily, shaped to maximize the contact area between terminal 30 and shorting member 14. In similar manner, the diameter of shorting member 14 is preferably selected to maximize the contact area with inner surface 17 of the casing at interface 50 established therebetween (see FIG. 4*b*). The contacting faces can be formed of any suitably conductive material such as steel, iron, copper, silver, gold, etc. Inner surface 16 and ball shaped shorting member 14 are coated with a film of graphite to provide the previously cited benefits of this invention.

Insofar as embodiments of the present invention are contemplated as substitutes for mercury tilt switches, graphite film coated conductors have the advantage of an increased temperature operating range. Thus, graphite film coated conductors will operate well outside of the typical mercury operating range of −40° C. to about 150° C. In addition, unlike most mercury tilt switches, the inventive tilt switch is made of non-frangible components (i.e. metals or plastics versus glass).

Generally, inner surface 16 of the casing, shorting element 14 and face 51 are all coated by the graphite film. It will be appreciated that inner surface 16, shorting element 14 and face 51 are not perfectly smooth, and as shown in FIGS. 4*a* and 4*b*, produce between one another, spacings of various gaps as a function of the force exerted by shorting element 14 toward face 51. That force is a function of gravity and the roughness of the opposing materials. It is desirable for the geometry of those components to maximize the contact area which will provide the maximum number of sites where the interfacial gap is minimized.

To enhance the number of such sites, it is also desirable to highly polish or smoothly finish the surfaces which define interfaces 50, 52, thereby minimizing the number of large projections which, by virtue of their presence, tend to separate the surfaces in a manner creating large gaps instead of the desired small gaps.

The graphite film must possess a relatively high electrical resistivity in the transverse direction (so as to avoid conducting current directly between terminal 30 and casing 12), and yet possess a relatively low electrical resistivity across a thin film (i.e., when disposed in interfaces 50, 52) so as to be highly electrically conductive in the direction normal to the film thickness.

Figure 3:
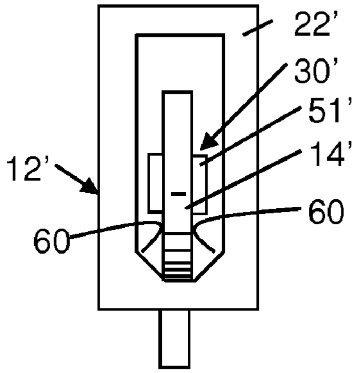
FIG. 3 depicts another embodiment similar to FIG. 1 but using a cylinder as the shorting element.

FIG. 3 depicts a device similar to FIG. 1 except that the spherical shorting element has been replaced by cylindrical shorting element 14' of circular cross section, and shoulders 60 have been provided on a floor of casing 12' to keep the cylinder properly centered. Also, face 51' of insulated terminal 30' has been shaped as a segment of a cylinder to conform to the outer periphery of cylinder 14'.

In operation, it is obvious that if the left end of insulated terminal 30 or 30' is tilted so that it is above the right-hand end, shorting element 14 or 14' will roll away from face 51 or 51', thereby providing an open circuit. The bulk resistance of the graphite film conductor is so large that no shorting can occur between terminals 30 and 12, or 30' and 12'. Tilting the left end of terminal 30 to a level below the right-hand end will cause shorting element 14 or 14' to contact the casing and face 51 or 51' simultaneously, thereby closing the circuit. Connection to the switch is made via the external terminal portion of terminal 30, and to the casing via shell tab 28. The graphite film conductor contacts interfaces 50 and 52 thereby closing the circuit. Electrical resistance tests carried out in similar devices have indicated the presence of a contact resistance comparable to those found in prior art mercury switches of approximately the same size.

In another embodiment, shown in FIGS. 5*a* and 5*b*, the electrodes are in the form of a pair of semi-circular segments 60, 62 extending through insulator 32. The segments are horizontally spaced and include surfaces shaped complementarily to that of shorting member 14, i.e., either spherical or cylindrical. The shorting member contacts both electrodes simultaneously during tilting of the casing to close the circuit. All internal metal surfaces and components are coated with a graphite film.

In another embodiment, shown in FIGS. 6*a*-6*c*, semi-circular electrode segments 70, 72 are vertically spaced apart. Thus, shorting member 14 initially makes contact only with lower electrode 72 during tilting of the case (see FIG. 6*a*). Thereafter, in response to further tilting of the casing, shorting element 14 also contacts upper electrode 70 to close the circuit (see FIG. 6*b*). In that way, control is maintained over the extent to which the casing must tilt in order to cause the circuit to be closed. All internal metal surfaces and components are coated with a graphite film.

In still another embodiment of the invention, shown in FIG. 7, shorting elements 14 are disposed between two relatively rotatable cylindrical surfaces 80, 82. Surfaces 80, 82 constitute electrodes, and shorting elements 14 roll and slide while conducting current between those electrodes. All internal metal surfaces and components are coated with a graphite film.

In yet another embodiment of the invention, shown in FIG. 8, the electrodes comprise surface 90, and moveable member 92 variably positioned across surface 90. All metal surfaces and components are coated with a graphite film.

Depicted in FIG. 9*a*, 9*b* is a preferred embodiment of an omni-directional tilt switch which is normally open and is closed by being tilted in any direction by a predetermined angle. As a result of such tilting, electrically conductive ball 100 is displaced from a position seated on a spherical surface of terminal 114 (FIG. 9*a*) to a position engaging both terminal 114 and a wall of conductive casing 112 (FIG. 9*b*). All internal metal surfaces and components are coated with a graphite film.

In FIGS. 10*a* and 10*b* there is shown an embodiment of a tilt switch which is normally closed. That is, electrically conductive ball 120 normally engages head 122 of terminal 124 (FIG. 10*a*) and edge 126 of casing 128. When casing 128 is tilted beyond a predetermined angle (FIG. 10*b*) ball 120 rolls into recess 130 of casing 128 and out of contact with terminal 124 to open the circuit. The surface of head 122 can be of any suitable shape, such as spherical to conform to the shape of ball 120. All internal metal surfaces and components are coated with a graphite film.

In FIGS. 11*a* and 11*b*, there is shown an embodiment of a dual angle tilt switch which is normally closed. That is, electrically conductive ball 120 normally contacts terminal 124 and terminal 124' when the orientation of the tilt switch is less than +/− angle θ. When insulated casing 32 is tilted more than +/− angle θ (FIG. 11*b*) ball 120 rolls into recess 130 of casing 32 and out of contact with terminal 124' to open the circuit. All internal metal surfaces and components are coated with a graphite film.

In FIGS. 12*a* and 12*b*, there is shown an embodiment of a dual angle tilt switch which is normally open. That is, electrically conductive ball 120 normally contacts terminals 124 when the orientation of the tilt switch is less than +/− angle θ. Since terminals 124 are in common electrical communication with each other, no circuit is completed. When insulated casing 32 is tilted more than +/− angle θ (FIG. 12*b*) ball 120 rolls into recess 130 of casing 32 and shorts terminal 124' to terminal 124 to close the circuit. All internal metal surfaces and components are coated with a graphite film.

In FIGS. 13*a* and 13*b*, there is shown an embodiment of a dual angle tilt switch which is normally closed. That is, electrically conductive ball 120 normally contacts terminal 124 and terminal 124' when the orientation of the tilt switch is less than +/− angle θ. When insulated casing 32 is tilted more than +/− angle θ (FIG. 13*b*) ball 120 rolls out of hole 130 of casing 32 and out of contact with terminal 124 to open the circuit. All internal metal surfaces and components are coated with a graphite film.

In all of the above embodiments of FIGS. 1 through 13*b*, a graphite film functions to significantly reduce the electrical resistivity at the terminal interfaces in the manner explained earlier herein.

In FIGS. 14*a* and 14*b*, there is shown an embodiment of a dual angle tilt indicator enhancement. That is, ball 120 normally rests at the apex of internal cavity 130 when the orientation of the tilt switch is less than +/− angle θ. In this orientation ball 130 completely fills aperture 132 thus indicating state A. When casing 32 is tilted more than +/− angle θ (FIG. 14*b*) ball 120 rolls into a recess of internal cavity 130 of casing 32 and is hidden from view in aperture 132 thus indicating state B. Of course, modifications of this indicator can be made to function as both a passive indicator and an electrical tilt switch in a common unit utilizing the advantages of the aforementioned graphite film.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A self actuated tilt switch for reducing electrical hysteresis, comprising:

a casing enclosing a displaceably mounted shorting member, said casing having an electrically conductive inner surface associated with a circuit;

said electrically conductive inner surface coated with a graphite film for reducing electrical hysteresis to below 1 degree (1°), said graphite film acting as an insulator or conductor as a function of said graphite film's thickness;

said casing sealed at one end by an insulating layer within a conductive shell, said conductive shell at least partially contacting said electrically conductive inner surface of said casing;

at least one electrode associated with said circuit inside of said casing;

said at least one electrode further comprising a terminal face for engaging said shorting member, said terminal face coated with a graphite film for reducing said electrical hysteresis;

said shorting member coated with a graphite film for reducing said electrical hysteresis; and said shorting member for closing said circuit once reaching a predetermined threshold angle.

2. The self actuated tilt switch of claim 1, wherein said shorting member comprises a substantially spherical shorting member.

3. The self actuated tilt switch of claim 1, wherein said shorting member comprises a substantially cylindrical shorting member.

4. The self actuated tilt switch of claim 1, having two electrodes.

5. The self actuated tilt switch of claim 4, said two electrodes vertically displaced from each other.

6. The self actuated tilt switch of claim 4, said two electrodes horizontally displaced from each other.

7. The self actuated tilt switch of claim 1, wherein said terminal face comprises a conformal shape to said shorting member.

8. The self actuated tilt switch of claim 1, wherein said shorting member and said terminal face further comprise smoothly finished surfaces.

9. The self actuated tilt switch of claim 1, wherein said casing further comprises a recess for engaging said shorting member to open said circuit once reaching a predetermined threshold angle.

10. The self actuated tilt switch of claim 1 further comprising a passive angle indicating device, for visually indicating the reaching of said predetermined threshold angle.

11. A self actuated tilt switch, comprising:

a casing enclosing a displaceably mounted shorting member, said displaceably mounted shorting member coated with a graphite film for reducing electrical hysteresis;

said graphite film acting as an insulator or conductor as a function of said graphite film's thickness;

a plurality of stationary electrodes inside said casing, said stationary electrodes coated with a graphite film for reducing operating hysteresis; and said shorting member closing a circuit once reaching a predetermined threshold angle.

12. The self actuated tilt switch of claim 11, comprising two electrodes.

13. The self actuated tilt switch of claim 11, comprising three electrodes.

14. The self actuated tilt switch of claim 11, wherein said tilt switch further comprises an omni-directional tilt switch.

15. The self actuated tilt switch of claim 11, wherein said tilt switch further comprises a dual-angle tilt switch.

16. The self actuated tilt switch of claim 11, wherein said casing further comprises an electrically conductive casing.

17. The self actuated tilt switch of claim 11, further comprising a passive angle indicating device, for visually indicating the reaching of said predetermined threshold angle.

18. The self actuated tilt switch of claim 11, wherein said casing further comprises a recess for engaging said shorting member, said recess operable to engage said shorting member once reaching a predetermined threshold angle.

19. A method for indicating the reaching of a predetermined threshold angle, comprising the steps of:

measuring an angle by using an electrically conductive shorting member coated with a graphite film, said graphite film acting as an insulator or a conductor as a function of said graphite film's thickness;

contacting said shorting member to two electrically conductive surfaces coated with a graphite film once said predetermined threshold angle is reached;

activating a circuit once said shorting member contacts said two electrically conductive surfaces;

removing said shorting member from the contact of at least one of said two electrically conductive surface once said pre-determined threshold angle is no longer reached;

de-activating said circuit once said shorting member leaves contact with at least one of said two electrically conductive surfaces; and wherein operating hysteresis is reduced.

20. The method of claim 19 further comprising the step of visually indicating the reaching of said predetermined threshold angle via a passive indicating device.

* * * * *